United States Patent
Zhang

[11] Patent Number: 5,667,574
[45] Date of Patent: Sep. 16, 1997

[54] STARCH-BASED COMPOSITION FOR PREPARING AN ENVIRONMENT DEGRADABLE α-OLEFINIC POLYMER MOLDING MATERIAL

[75] Inventor: Yuan Qing Zhang, Chengdu, China

[73] Assignee: Chi May Co., Ltd., Taipei, Taiwan

[21] Appl. No.: 744,523

[22] Filed: Nov. 6, 1996

[51] Int. Cl.$^6$ ...................................... C08L 3/00
[52] U.S. Cl. .................. 106/209.1; 522/29; 522/88; 523/124; 523/125; 523/126; 523/128; 523/351; 524/47; 524/52
[58] Field of Search .................. 106/209.1; 522/29, 522/88; 523/351, 124, 125, 126, 128; 524/47, 48, 49, 50, 51, 52

[56] References Cited

U.S. PATENT DOCUMENTS

| | | | |
|---|---|---|---|
| 4,931,488 | 6/1990 | Chiquet | 523/126 |
| 5,461,093 | 10/1995 | Yoo et al. | 523/126 |
| 5,461,094 | 10/1995 | Yoo et al. | 523/126 |

FOREIGN PATENT DOCUMENTS

| | | | |
|---|---|---|---|
| 2612931 | 9/1988 | France | 523/125 |

*Primary Examiner*—Peter A. Szekely
*Attorney, Agent, or Firm*—Bacon & Thomas

[57] ABSTRACT

A starch-based composition for preparing an environment degradable α-olefinic polymer molding material, which includes 95–99 wt % of starch, 0.2–0.8 wt % of a titanate coupling agent having the following formula (I), 0–2 wt % of paraffin and 0–2 wt % of fatty acid:

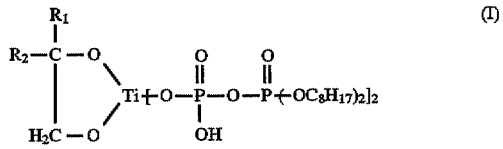

wherein $R_1$ and $R_2$ are hydrogen, or $R_1$ and $R_2$ together are =O.

12 Claims, No Drawings

STARCH-BASED COMPOSITION FOR PREPARING AN ENVIRONMENT DEGRADABLE α-OLEFINIC POLYMER MOLDING MATERIAL

FIELD OF THE INVENTION

The present invention is related to a biodegradable and photodegradable α-olefinic polymeric material, and, in particular, to a starch-based composition for preparing said biodegradable and photodegradable α-olefinic polymeric material.

BACKGROUND OF THE INVENTION

The α-olefinic polymers, such as polyethylene, including low density polyethylene (LDPE), high density polyethylene (HDPE) and linear low density polyethylene (LLDPE), and polystyrene are used extensively in making packing materials, for example: bags, bottles, and films, etc. Most of these packing materials at the end are disposed in garbage yards or combusted in incinerators. Therefore, there is a need in the industry to make a polymeric material which is biodegradable, and thus is environment friendly. Many attempts have been made, and results thereof can be found in, for example, U.S. Pat. Nos. 5,115,000; 5,162,392; 5,281, 681; 5,324,794; 5,334,700; 5,367,003; 5,367,033; 5,391, 423; and 5,424,346.

An object of the present invention is to provide a starch-based composition for preparing an α-olefinic polymer molding material which is biodegradable and photodegradable, in short, environment degradable.

Another object of the present invention is to provide a starch-based master batch for preparing an environment degradable α-olefinic polymer molding material.

A further object of the present invention is to provide an environment degradable α-olefinic polymer material and articles made therefrom.

SUMMARY OF THE INVENTION

In order to accomplish the objects of the present invention, a starch-based composition for preparing an environment degradable α-olefinic polymer molding material formulated in accordance with the present invention comprises 95–99 wt % of starch, 0.2–0.8 wt % of a titanate coupling agent having the following formula (I), 0–2 wt % of paraffin and 0–2 wt % of fatty acid:

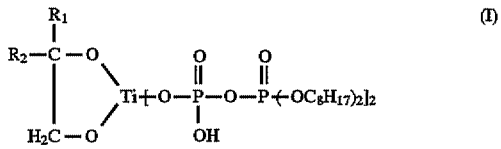

wherein $R_1$ and $R_2$ are hydrogen, or $R_1$ and $R_2$ together are =O.

Preferably, said fatty acid is $C_{12}$–$C_{20}$ fatty acid.

DETAILED DESCRIPTION OF THE INVENTION

The present invention discloses a starch-based composition for preparing an environment degradable α-olefinic polymer molding material comprising 95–99 wt % of starch, 0.2–0.8 wt % of a titanate coupling agent having the formula (I), 0–2 wt % of paraffin and 0–2 wt % of fatty acid.

The present invention discloses, alternatively, a starch-based master batch which is useful for preparing an environment degradable α-olefinic polymer pellets or powder, which comprises 50–80 wt % of said starch-based composition, 18–49.8 wt % of α-olefinic polymer, 0.1–1.0 wt % of a photosensitizer, and 0.1–1.0 wt % of a photosensitizer promoter.

Preferably, said α-olefinic polymer contained in said starch-based master batch includes (but not limited to) low density polyethylene (LDPE), linear low density polyethylene (LLDPE), and a mixture of LDPE and LLDPE, more preferably, a LLDPE or a mixture of LDPE and LLDPE having a weight ratio of LDPE:LLDPE=10:70~45:30.

Moreover, the present invention also discloses an environment degradable α-olefinic polymer molding material which is prepared by using said starch-based composition or said starch-based master batch directly. Said environment degradable α-olefinic polymer material comprises 15–49 wt % of said starch-based composition, 50.8–84.8 wt % of α-olefinic polymer, 0.1–1.0 wt % of a photosensitizer, and 0.1–1.0 wt % of a photosensitizer promoter.

Preferably, said α-olefinic polymer contained in said environment degradable α-olefinic polymer molding material includes (but not limited to) low density polyethylene (LDPE), high density polyethylene (HDPE), linear low density polyethylene (LLDPE), polystyrene, a mixture of LDPE and LLDPE, a mixture of LLDPE and polystyrene, and a mixture of LDPE, LLDPE and polystyrene. More preferably, said α-olefinic polymer is a mixture of LDPE and LLDPE having a weight ratio of LDPE: LLDPE= 10:70~45:30; a mixture of LLDPE and polystyrene having a weight ratio of LLDPE: polystyrene=5:80~30:25; or a mixture of LDPE, LLDPE and polystyrene having a weight ratio of LDPE: LLDPE: polystyrene=10:70:800~45:30:60.

Suitable starch for use in the present invention includes modified starch and unmodified starch, preferably unmodified starch such as corn starch and the like.

Said photosensitizer can be any one known in the art, and a typical photosensitizer is a transition metal salt of di(butylthio)aminoformic acid, such as an iron salt thereof.

Said photosensitizer promoter can be any one known in the art, and typically are stearates, for example: zinc stearate and calcium stearate.

A suitable process for preparing said starch-based master batch comprises mixing 95–99 parts by weight of starch, 0.2–0.8 parts by weight of said titanate coupling agent having the formula (I), 0–2 parts by weight of paraffin and 0–2 parts by weight of fatty acid; and mixing and kneading 50–80 parts by weight of the resulting mixture with 18–49.8 parts by weight of said α-olefinic polymer, 0.1–1.0 parts by weight of said photosensitizer and 0.1–1.0 parts by weight of said photosensitizer promoter at a temperature of 120° C. to 10° C. and for a period of time, preferably 5–10 minutes, sufficient to well mix the components in a molten form; and cooling and pelleting the resulting molten mixture.

Said environment degradable α-olefinic polymer molding material of the present invention can be prepared by using said starch-based master batch and by using a conventional compounding process.

Said environment degradable α-olefinic polymer molding material of the present invention can be used to make bags, bottles, foamed sheets and films, etc., with conventional plastic molding techniques.

The invention will be further illustrated by the following examples in which parts and percentages are by weight unless otherwise indicated. The following examples are only meant to illustrate the invention, but not to limit it.

EXAMPLE 1

Environment Degradable LLDPE Master Batch 100 parts of yam starch, 0.1 parts of paraffin, 0.2 parts of $C_{18}$ fatty acid, 0.4 parts of the titanate coupling agent ($R_1$ and $R_2$ together are =O) were well mixed and milled. 75 parts of the resulting mixture, 24.5 parts of LLDPE, 0.3 parts of iron salt of di(butylthio)aminoformic acid, and 0.2 parts of zinc stearate were then kneaded in a sealed kneading machine at 140° C. for 8 minutes followed by cooling and cracking the cooled mixture into particles.

EXAMPLE 2

Environment Degradable LLDPE/LDPE Master Batch 100 parts of corn starch, 0.2 parts of paraffin, 0.3 parts of lauric acid, 0.2 parts of the titanate coupling agent ($R_1$ and $R_2$ are both hydrogen) were well mixed and milled. 75 parts of the resulting mixture, 12.25 parts of LLDPE, 12.25 parts of LDPE, 0.3 parts of iron salt of di(butylthio)aminoformic acid, and 0.4 parts of zinc stearate were then kneaded in a sealed kneading machine at 140° C. for 8 minutes followed by cooling and cracking the cooled mixture into particles.

EXAMPLE 3

Environment Degradable LLDPE/LDPE Film

The environment degradable LLDPE master batch prepared in Example 1, LLDPE and LDPE were fed in a ratio of 35:50:15 to a blown film molding machine operated at a temperature profile of 130°–180° C., wherein the melt indexes of said LLDPE and LDPE were 2.43 and 2.06, respectively. The properties of the resulting film are listed in Tables 1 and 2.

EXAMPLE 4

Environment Degradable LLDPE/LDPE Film

The environment degradable LLDPE/LDPE master batch prepared in Example 2 and LDPE were fed in a ratio of 70:30 to a blown film molding machine operated at a temperature profile of 130°–180° C., wherein the melt index of said was 2.06. The photodegradation properties of the resulting film are listed in Tables 1 and 2.

TABLE 1

Loss of elongation at break during UV exposure[a]

| Exposure time (day) | 0 | 1 | 3 | 6 | 9 | 14 |
|---|---|---|---|---|---|---|
| Example 3 | 319 | 150 | 16 | Auto-breaking | | |
| Example 4 | 322 | 251 | 29 | Auto-breaking | | |
| Control | 473 | 429 | 438 | 429 | 289 | 54 |

[a] ASTM D5071-91. Tester: Q-UV Accelerated Weathering Tester, Q-Panel Co., U.S.A.; Lamp: UVA-340, 343 nm peak, 296 nm 1% cut-off; Cycle: 20 hrs UV/50° C., 4 hrs CON/40° C.

TABLE 2

Percentage elongation at break during UV exposure[a]

| Exposure time (day) | 0 | 1 | 3 | 6 | 9 | 14 |
|---|---|---|---|---|---|---|
| Example 3 | 100 | 47 | 5 | 0 | | |
| Example 4 | 100 | 78 | 9 | 0 | | |
| Control | 100 | 91 | 93 | 91 | 61 | 11 |

[a] Same as Table 1

EXAMPLE 5

Environment Degradable LLDPE/Polystyrene Sheet

The environment degradable LLDPE master batch prepared in Example 1 and polystyrene were fed in a ratio of 25:75 to an extruder operated at a temperature profile of 170°–180° C. to form a sheet product. The biodegradation properties of the resulting sheet product and the environment degradable LLDPE master batch prepared in Example 1 are listed in Tables 3 and 4.

Biodegradability Test

In accordance with ASTM D5209-91, to determine the degree and rate of degradation of plastics samples in activated sludge.

Activated sludge collected from municipal sewage treatment works was aerated and cultured in glass vessels. The specimen was placed in the vessel to expose to the activated sludge and was converted by biological actions into soluble organic compounds and carbon dioxide. By measuring the soluble organic compounds and carbon dioxide produced, and also by measuring the weight loss of the specimen, the biodegradability in terms of degree and rate of degradation were determined.

The LLDPE master batch of Example 1 used in the test was precompression molded into thin sheet. The Control-1 used in the test was tissue paper sample, and the Control-2 was dried leaf sample.

TABLE 3 pH value, weight, $CO_2$ produced and SOC in biodegradability test

| Sample | Ex. 1 | Ex. 5 | Control-1 | Control-2 | Blank |
|---|---|---|---|---|---|
| Initial pH | 6.48 | 6.36 | 6.77 | 6.22 | 6.54 |
| Final pH | 3.76 | 3.91 | 4.08 | 4.19 | 5.33 |
| Initial weight (g) | 15.20 | 6.51 | 15.16 | 6.08 | — |
| Final weight (g) | 5.27 | 3.35 | 9.83 | 3.16 | — |
| $CO_2$ produced (mmole) | 90.0 | 32.3 | 39.4 | 18.6 | 8.9 |
| Final SOC (mg/L) | 199.5 | 3.2 | 73.9 | 25.5 | 0 |

TABLE 4

Degree and rate of degradation

| Sample | Degree of degradation (wt %) | Rate of degradation (mg/g-d) |
|---|---|---|
| Ex. 1 | >22.0 | >2.9 |
| Ex. 2 | >9.4 | >2.3 |
| Control-1 | >8.2 | >1.2 |
| Control-2 | >5.9 | >1.2 |

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A starch-based composition for preparing an environment degradable α-olefinic polymer molding material, which comprises 95–99 wt % of starch, 0.2–0.8 wt % of a titanate coupling agent having the following formula (I), 0–2 wt % of paraffin and 0–2 wt % of fatty acid:

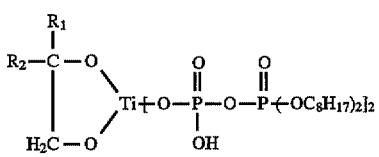 (I)

wherein $R_1$ and $R_2$ are hydrogen, or $R_1$ and $R_2$ together are =O.

2. The starch-based composition according to claim 1, wherein said fatty acid is $C_{12}$–$C_{20}$ fatty acid.

3. A starch-based master batch for preparing an environment degradable α-olefinic polymer molding material, which comprises 50–80 wt % of the starch-based composition according to claim 1, 18–49.8 wt % of α-olefinic polymer, 0.1–1.0 wt % of a photosensitizer, and 0.1–1.0 wt % of a photosensitizer promoter.

4. The starch-based master batch according to claim 3, wherein said α-olefinic polymer is low density polyethylene (LDPE), linear low density polyethylene (LLDPE), or a mixture of LDPE and LLDPE.

5. The starch-based master batch according to claim 4, wherein said mixture of LDPE and LLDPE has a weight ratio of LDPE: LLDPE=10:70–45:30.

6. The starch-based master batch according to claim 3, wherein said photosensitizer is a transition metal salt of di(butylthio)aminoformic acid.

7. The starch-based master batch according to claim 3, wherein said photosensitizer promoter is a stearate.

8. An environment degradable α-olefinic polymer molding material comprising 15–49 wt % of the starch-based composition according to claim 1, 50.8–84.8 wt % of α-olefinic polymer, 0.1–1.0 wt % of a photosensitizer, and 0.1–1.0 wt % of a photosensitizer promoter.

9. The environment degradable α-olefinic polymer molding material according to claim 8, wherein said α-olefinic polymer is low density polyethylene (LDPE), high density polyethylene (HDPE), linear low density polyethylene (LLDPE), polystyrene, a mixture of LDPE and LLDPE, a mixture of LLDPE and polystyrene, or a mixture of LDPE, LLDPE and polystyrene.

10. The environment degradable α-olefinic polymer molding material according to claim 9, wherein said α-olefinic polymer is a mixture of LDPE and LLDPE having a weight ratio of LDPE:LLDPE=10:70–45:30 or a mixture of LLDPE and polystyrene having a weight ratio of LLDPE:polystyrene=5:80–30:25.

11. The environment degradable α-olefinic polymer molding material according to claim 8, wherein said photosensitizer is a transition metal salt of di(butylthio) aminoformic acid.

12. The environment degradable α-olefinic polymer molding material according to claim 8, wherein said photosensitizer promoter is a stearate.

* * * * *